Nov. 25, 1958  F. GAJDOSIK  2,861,542
PLANT FOR THE CONTINUOUS MANUFACTURE OF FAT-IMPREGNATED LEATHER
Filed Nov. 25, 1955  2 Sheets-Sheet 1
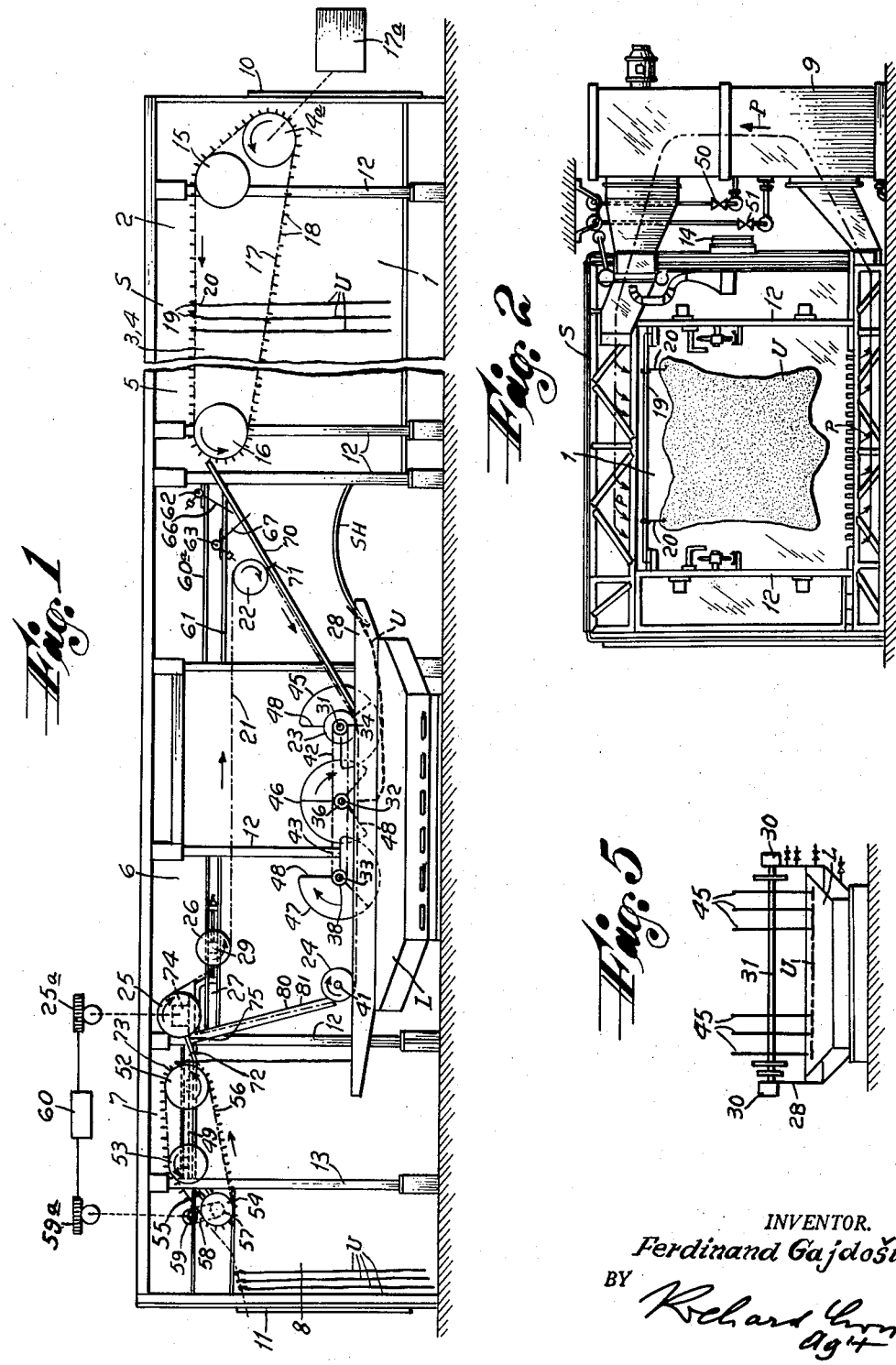
INVENTOR.
Ferdinand Gajdošík
BY

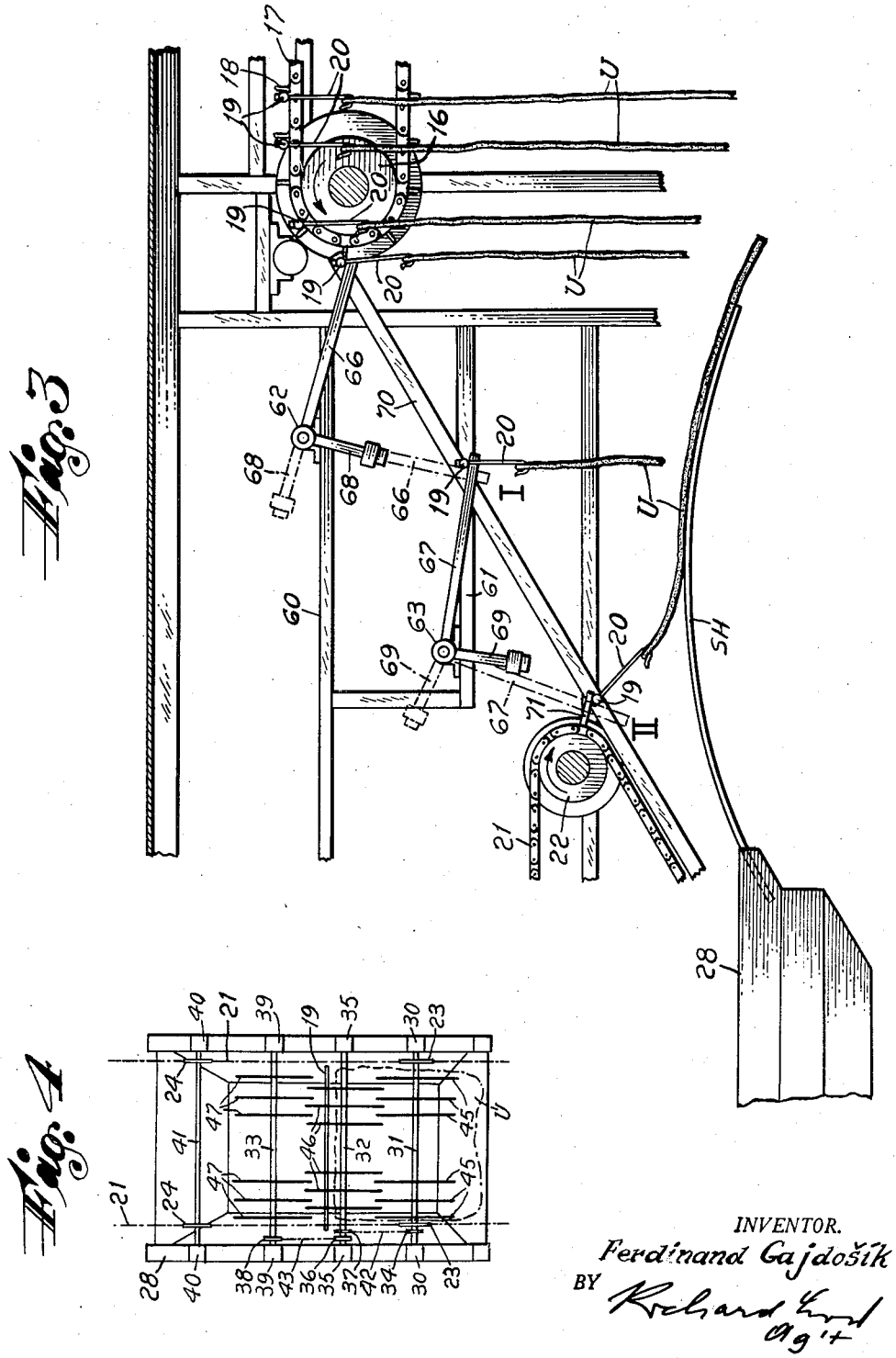

United States Patent Office 2,861,542
Patented Nov. 25, 1958

2,861,542

PLANT FOR THE CONTINUOUS MANUFACTURE OF FAT-IMPREGNATED LEATHER

Ferdinand Gajdošík, Otrokovice, Czechoslovakia, assignor to Svit, národní podnik, Gottwaldov, Germany Application November 25, 1955, Serial No. 549,097

Claims priority, application Czechoslovakia November 27, 1954

2 Claims. (Cl. 118—423)

The object of the present invention is to provide a plant for the automatic continuous manufacture of dessicated fat-impregnated technical leather which is then particularly adapted for use in the production of drive belts, packing leather cups, lining for flywheels of friction presses and similar articles.

Hitherto, leathers for technical purposes have been treated in such a way that all operations connected with the conveyance of the leathers during preliminary drying, drying out and immersion into the fat-impregnation bath have been performed by hand, which required an excessive strain on the part of the workers, working in a humid atmosphere at temperatures above 50° C.

An essential drawback of such production method for manufacturing technical leather consisted in a relatively small output at considerable production cost, without obtaining always a first-rate product.

The aforesaid disadvantages have now been eliminated by the production plant according to the present invention for the continuous manufacture of leather for technical purposes, the main feature of the plant according to the invention consisting in that the conveying chain with the leathers individually suspended thereon in the inlet drier space is shifted continuously further into the preliminary drying chamber wherefrom the leathers in a pre-dried state are conveyed by the same conveying chain into the dessication chambers and further into the pre-heating chamber. From the preheating chamber the leathers are brought one at a time through a transferring device into the impregnating chamber and onto a further conveying chain, by which the leathers are drawn through the well known fat bath through the action of an immersion device, the leathers being then carried upwards by the same conveying chain and transferred in continuous sequence onto a further endless chain in the fixing chamber, and which projects into the storage chamber forming a magazine of the finished leathers.

Before being drawn through the fat bath, the leathers must be dried out at an elevated temperature to a moisture degree not exceeding 3 to 6 percent. The fat-impregnating process is then carried out in a well known manner, by passing the dried out and pre-heated skins during a certain period through a fat bath heated up to 55–75° C. A skin which had not been dried out to a sufficient degree, even if only damp in its interior, would not be able to withstand the effect of such relatively high temperature of the fat-impregnation bath which would result in the decay of the finished leather or even in burning and destruction of the leather mass of the damp section of the croupon.

In equipment in accordance with the present invention, the skin passes in continuous sequence through a tunnel space divided into drying chambers with air conditioning towers enabling the drying air to be adequately prepared for an automatic control and recording, so that a uniform high quality of the dried skins can be attained before entering the fat-impregnation bath.

The precisely timed stepwise passage of the skins through the fat-impregnation bath contributes likewise to a high and uniform quality of the finished product.

Hitherto, it has been impossible to time the impregnation periods precisely by carrying out the necessary operations manually and therefore it has been impossible to obtain the required high-grade product.

By converting the hitherto usual hand labour into an automatic and controllable impregnation period in accordance with the present invention, the aforesaid irregularity has now been eliminated. At the same time, the hitherto indispensable strain put on the workers performing all the above mentioned operations by hand, is now confined to bringing the skins on to the conveyor and to removing the finished leather therefrom.

The object of the present invention will now be described more fully with reference to the accompanying drawings wherein Fig. 1 represents a diagrammatic side view of a plant for the continuous production of leathers for technical purposes, treated by fat-impregnation, Fig. 2 a diagrammatic entrance end view of equipment included in the plant according to the invention, Fig. 3 a partial view of a transferring device included in the plant of Fig. 1, Fig. 4 a diagrammatic plan view of a holding-down dripping device of an impregnation bath in the plant of Fig. 1, and Fig. 5 a diagrammatic front view of the device according to Fig. 4.

A tunnel space 1 of the drying plant embodying this invention is divided in a longitudinal direction into a pre-drying chamber 2, drying-out chambers 3 and 4, a pre-heating chamber 5, a fat-impregnation chamber 6, a fixing chamber 7 and a storage chamber 8. Within the chambers 2, 3, 4, 5 is circulated, in a direction indicated by arrow P the air which had been previously conditioned in a suitable manner in two conditioning towers 9 (see Fig. 2) associated with each of the chambers and wherein the humidity of the air is automatically controlled by valves 50 and 51 to conform with the pre-determined and adjusted conditions for the operation of the drying plant. The properties of the circulating air are controlled through automatic control and recording instruments 14a (Fig. 2) for each pair of conditioning towers. The remaining equipment of the drying plant does not directly concern the object of the present invention and therefore is not included in the following description or in the drawings.

The independent tunnel drying plant S with its inlet wall 10 and outlet wall 11 is inside the tunnel space 1 provided in a transverse direction with columns 12 (Figs. 1 and 2). Inside the pre-drying chamber 2, drying-out chambers 3, 4 and pre-heating chamber 5 drive pulleys 14a, 15 and 16 are mounted on the top portions of said columns 12 and carry an endless conveyor chain 17 (Fig. 1). A suitable conventional drive assembly, represented schematically at 17a, is coupled to one of the drive pulleys for effecting the intermittent, step-by-step advancement of the conveyor chain 17. The endless conveyor chain 17 is provided with noses 18 to engage behind and transport rods 19 lying on the upper run of the chain and having hooks 20 depending therefrom from which the skins U can be suspended.

Within the fat-impregnation chamber 6 a further endless conveyor chain 21 is provided, and runs around pulleys 22, 23, 24, 25 and 26, the pulleys 25 and 26 being mounted rotatably in bearings 74 and 29 linked up with the carrier 27 of the drying plant (Fig. 1). The pulleys 23 and 24 are mounted rotatably on shafts 31 and 41 in bearings 30 and 40 mounted on the frame of an impregnation vat 28 (Figs. 1 and 4). On the shaft 31 of the pulleys 23 a pulley 34 is rotatably arranged and is connected, through an endless chain 42, with a pulley 37 on a shaft 32. On the shaft 32, mounted turnably within the bearings 35 of the frame of the fat-impregnation vat 28 a further pulley 36 is arranged and is connected, through the endless chain 43, with a pulley 38 on a shaft 33. The pulleys 23 on the shaft 31 are connected, through endless chains 21, with the pulleys 24 on the shaft 41 whereby all four shafts 31, 32, 33 and 41 are simultaneously rotatable (Fig. 4). On each of said shafts 31, 32 and 33, as can be seen in Figs. 1, 4 and 5 six dipping holding-down stirrups 45, 46 and 47 are provided for action during the passage of the skin U through the fat-impregnation bath L (Figs. 1, 4 and 5). The stirrups 45, 46 and 47 are provided with cutouts 48 enabling the movement by the conveyor chain 21 of the rods 19 with the skins U suspended thereon through the fat-impregnation bath L (Figs. 1 and 5).

On a carrier 49 connected with the columns 12 and 13 inside the fixing chamber 7, pulleys 52 and 53 are arranged, as can be seen in Fig. 1 and on an inclined carrier 55 connected with the column 13 in the storage chamber 8, a pulley 54 is rotatably arranged. The pulleys 52, 53 and 54 carry an endless chain 56 running therearound. Co-axially with the pulley 54 another pulley 57 is mounted and connected through an endless chain 58 with a pulley 59 driven together with the pulley 25 through worm drives, which are schematically represented at 59a and 25a, from an electric motor 60.

Inside the fat-impregnation chamber 6 at its top part are provided carriers 60a and 61 which support bearings 62 and 63 carrying the transferring devices formed by toggle levers 66 and 67, the shorter arms 68 and 69 of which are adjustable equalizing arms.

The plant above described operates as follows:

The skin U having undergone the necessary treatment on a punching machine is suspended by means of hooks 20 on a rod 19 and introduced into the drying plant through an aperture provided in the inlet wall 10 and brought onto the conveyor chain 17, whereupon the whole mechanism is set in motion by a push button not illustrated. The skin U advances inside the pre-drying chamber 2 through a distance of 150 mm. whereupon the whole device is stopped. Each skin is suspended in the same way on the hooks 20 and rods 19 and set by the push button not illustrated into motion, which process is repeated, until the chambers 2, 3, 4 and 5 are entirely filled up with skins. By the same conveyor chain 17 the skins U are advanced inside the chambers in such a manner that they are first pre-dried in the chamber 2, then dried out in the chambers 3 and 4 and finally pre-heated in the chamber 5. The air circulating inside said chambers is automatically adapted in air conditioning towers 9 (Fig. 2) in accordance with the pre-determined operational conditions of the drying plant, through the action of well known control and recording instruments. The skins are proceeding at the adjusted necessary temperature and required dampness through the four chambers 2, 3, 4 and 5 following an accurately determined technological cycle. This drying process enables the hitherto usual drying period of 240 hours to be reduced to only 24 hours, that is, to 1/10.

As soon as a skin, having passed through the whole drying plant (4 chambers), arrives at the end of the conveyor chain 17, the rod 19 suspended together with the skin U on the hooks 20 glides down, as indicated in Fig. 3, onto the transferring device formed by the toggle levers 66 and 67 and onto the inclined carrier 70 where its gliding down movement is caught up by the end of one arm of the toggle lever 66. After both ends of the rod 19 have been brought down together with the skin U onto the arms of the toggle lever 66, the weight of the rod 19 and the skin U overcomes that of the equalizing arm 68, and the rod 19 with the skin U is evenly transferred into the position I (Fig. 3). Through the influence of the equalizing shorter arms 68, 69 of the levers 66, 67 turning in the bearing 62, 63, the movement of the rod 19 and skin U is slowed down. The rod 19, as can be seen in Fig. 3, moves from the position I to the end of the longer arm of the toggle lever 67 in the bearings 63. Through the weight of the skin U, the arms of the lever 67 with the rod 19 and skin U swing out into the position II indicated in dotted lines, and a nose 71 or 75 on a further conveyor chain 21 (Figs. 1 and 3) then engages in back of the rod 19 to move the latter out of engagement with the toggle lever 67 and further along the path defined by the carrier 70. The letters SH designate a plate which is secured to the vat 28. The chain 21 further conveys the rod 19 with the skin U and the latter is simultaneously dipped progressively into the fat-impregnation bath by the dipping holding-down stirrups 45, 46 and 47 (Figs. 1, 4 and 5). In order to avoid any breaking of the continuous immersion passage of the skin U through the impregnation bath L, the holding down dipping stirrups 45, 46 and 47 are provided, as can be seen in Fig. 3 with cutouts 48 for the purpose of avoiding interference of the stirrups with the rods 19. After its passage through the bath L, the skin U is further transported upwards by the nose 71 or 75 of the conveyor chain 21, the excessive impregnation liquid dripping off during this transport.

The time required for movement of the skin U on the rod 19, from the moment of its transfer to the nose 71 of the chain 21 (Figs. 1 and 3) and during its movement through the bath L and upwards to a position above the carrier 72, corresponds to the time taken up by the transport over the distance of 150 mm. during the stepwise advance of the skin U on the rod 19 and hook 20 in the chambers 2, 3, 4 and 5. By this simultaneous movement, the nose 75 on the conveyor chain 21 is transferred simultaneously to the position of the nose 71 (Fig. 1) whenever a skin U has been transferred by the levers 66 and 67.

As soon as the skin U in its continuous movement arrives at the level of the inclined carrier 72 (Fig. 1), the related rod 19 is released from the nose 71 or 75 and it glides down along the carrier 72 onto one of the noses 73 of a further endless conveyor chain 58 inside the fixing chamber 7 where the excess fat is allowed to drip from the fat impregnated skins U and the latter are dried and cooled. Thereupon the skins U are conveyed in a further continuous sequence by the same conveyor chain 56 into the storage chamber 8 wherefrom they can be withdrawn as a finished product through an aperture provided in the outlet wall 11. On the skins under treatment being steadily introduced on the endless conveyor chain 17 through the opening in the inlet wall 10, the above disclosed plant is working continuously and automatically, with the exception of the manual introduction of the skins to be treated and the withdrawal of the finished leather.

The equipment according to the present invention makes it possible to avoid the hitherto usual heavy strain on the workers in a harmful atmosphere, where all the above described operations had to be performed by hand. The number of workers could be greatly reduced and their manual labour limited to the supply of tanned skins and the removal of the finished fat-impregnated leather. Thus, it is possible to attain a much higher productivity of work, an improved quality of the leathers for use in manufacturing drive belt and other technical objects, to reduce substantially the production cost and to eliminate human labour from hygienically harmful spaces.

I claim:

1. In a plant for the continuous production of fat impregnated leathers; the combination of an upwardly open bath containing fat for impregnation of hides passed therethrough, conveyor means extending across the top of said bath and operative to transport successive rod from which hides to be impregnated are individually suspended, drive means propelling said conveyor means at a speed sufficient to cause a hide suspended from a rod to stream rearwardly from the latter during passage through the bath so that all portions of the hide are equally immersed in the bath, and hold-down means associated with said conveyor means and operative to engage a transported hide from above and to hold the engaged hide in the bath during transport of the related rod across the top of the bath by said conveyor means.

2. In a plant for the continuous production of fat-impregnated leathers; the combination as in claim 7, wherein said hold-down means includes a series of laterally extending shafts spaced from each other in the direction of movement of said conveyor means, hold-down members of generally circular configuration on each of said shafts at axially spaced apart locations and extending below the level of the path of the successive rods transported by said conveyor means, each of said hold-down members having a peripheral notch therein, and means driving said shafts in synchronism with the movement of said conveyor means to dispose said peripheral notches for receiving a transported rod as the latter moves across the top of the bath so that interference of said hold-down members with the movement of the successive rods is avoided.

References Cited in the file of this patent

UNITED STATES PATENTS

| | | |
|---|---|---|
| 759,844 | Amidon | May 17, 1904 |
| 1,525,880 | Mueller | Feb. 10, 1925 |
| 1,694,447 | Merritt | Dec. 11, 1928 |

UNITED STATES PATENT OFFICE
CERTIFICATE OF CORRECTION

Patent No. 2,861,542                                               November 25, 1958

Ferdinand Gajdosik

It is hereby certified that error appears in the above numbered patent requiring correction and that the said Letters Patent should read as corrected below.

In the grant, lines 2 and 3, and in the heading to the printed specification, line 5, address of assignee, for "Gottwaldov, Germany", each occurrence, read -- Gottwaldov, Czechoslovakia --.

Signed and sealed this 29th day of September 1959.

(SEAL)
Attest:

KARL H. AXLINE
Attesting Officer

ROBERT C. WATSON
                                                                             Commissioner of Patents